(12) United States Patent
Komiyama

(10) Patent No.: US 9,686,447 B2
(45) Date of Patent: Jun. 20, 2017

(54) DISPLAY APPARATUS

(71) Applicant: CANON KABUSHIKI KAISHA, Tokyo (JP)

(72) Inventor: Tomoaki Komiyama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/602,864

(22) Filed: Jan. 22, 2015

(65) Prior Publication Data

US 2015/0215495 A1 Jul. 30, 2015

(30) Foreign Application Priority Data

Jan. 24, 2014 (JP) .................................. 2014-011098

(51) Int. Cl.
*H04N 5/46* (2006.01)
*H04N 5/05* (2006.01)
*H04N 5/74* (2006.01)
*H04N 5/08* (2006.01)
(Continued)

(52) U.S. Cl.
CPC ................. *H04N 5/05* (2013.01); *H04N 5/04* (2013.01); *H04N 5/08* (2013.01); *H04N 5/7441* (2013.01); *H04N 9/3185* (2013.01); *H04N 2005/745* (2013.01)

(58) Field of Classification Search
CPC .. H04N 5/05; H04N 5/04; H04N 5/08; H04N 2005/745
See application file for complete search history.

(56) References Cited

U.S. PATENT DOCUMENTS 6,043,803 A 3/2000 Shimizu
6,384,867 B1 5/2002 Seino et al.
(Continued)

FOREIGN PATENT DOCUMENTS

CN 101329857 A 12/2008
CN 101430874 A 5/2009
(Continued)

OTHER PUBLICATIONS

The above patent documents were cited in the Nov. 17, 2015 Japanese Office Action, which is enclosed without an English Translation, that issued in Japanese Patent Application No. 2014-011098.
(Continued)

Primary Examiner — Brian Yenke
Assistant Examiner — Humam Satti
(74) Attorney, Agent, or Firm — Cowan, Liebowitz & Latman, P.C.

(57) ABSTRACT

A display apparatus includes a detecting unit that detects a start position and an end position of an effective image area of an analog image signal, and a determination unit that determines a candidate format as a format of the analog image signal if a first difference and a second difference satisfy a predetermined condition. The first difference represents a difference between the start position of the effective image area and a start position of an effective image area of the candidate format. The second difference represents a difference between the end position of the effective image area and an end position of the effective image area of the candidate format.

11 Claims, 7 Drawing Sheets

(51) Int. Cl.
*H04N 5/04* (2006.01)
*H04N 9/31* (2006.01)

(56) References Cited

U.S. PATENT DOCUMENTS

| | | | |
|---|---|---|---|
| 2002/0027614 A1* | 3/2002 | Konuma | H04N 5/45 |
| | | | 348/558 |
| 2002/0080280 A1* | 6/2002 | Champion | G09G 5/00 |
| | | | 348/584 |
| 2004/0090413 A1* | 5/2004 | Yoo | G09G 5/006 |
| | | | 345/100 |
| 2008/0316361 A1 | 12/2008 | Ito et al. | |
| 2009/0047001 A1* | 2/2009 | Kojima | H04N 5/765 |
| | | | 386/344 |
| 2009/0079870 A1 | 3/2009 | Matsui | |
| 2010/0253840 A1* | 10/2010 | Nave | G09G 5/005 |
| | | | 348/500 |
| 2012/0262546 A1* | 10/2012 | Tsukagoshi | H04N 13/0029 |
| | | | 348/43 |

FOREIGN PATENT DOCUMENTS

| | | |
|---|---|---|
| JP | 10-091127 A | 4/1998 |
| JP | 2000-305526 A | 11/2000 |
| JP | 2000-338925 A | 12/2000 |
| JP | 2008-107474 A | 5/2008 |
| JP | 2008-107700 A | 5/2008 |
| JP | 2008-224773 A | 9/2008 |

OTHER PUBLICATIONS

The above foreign documents were cited in the Oct. 10, 2016 Chinese Office Action, which is enclosed with an English Translation, that issued in Chinese Patent Application No. 201510035997.9.

\* cited by examiner

| FMT_NAME | hSyncFreq [KHz] | hResol [Pixel] | hStart [Pixel] | hEnd [Pixel] | hFp [Pixel] | vSyncFreq [Hz] | vResol [Line] | vStart [Line] | vEnd [Line] | vFp [Line] | vTotal [Line] | Sampling Clock [MHz] |
|---|---|---|---|---|---|---|---|---|---|---|---|---|
| 640x480 | 31.5 | 640 | 144 | 784 | 16 | 59.9 | 480 | 35 | 515 | 10 | 525 | 25.2 |
| 800x600 | 37.0 | 800 | 112 | 912 | 48 | 59.8 | 600 | 15 | 615 | 3 | 618 | 35.5 |
| 1024x768 | 47.8 | 1024 | 256 | 1280 | 48 | 59.9 | 768 | 27 | 795 | 3 | 798 | 63.5 |
| 1280x1024 | 63.9 | 1280 | 360 | 1640 | 48 | 60.0 | 1024 | 41 | 1065 | 1 | 1066 | 108.0 |
| 1400x1050 | 63.9 | 1400 | 248 | 1648 | 40 | 59.9 | 1050 | 15 | 1065 | 0 | 1065 | 108.0 |
| 1600x1200 | 74.0 | 1600 | 112 | 1712 | 48 | 59.9 | 1200 | 34 | 1232 | 3 | 1237 | 141.5 |
| 1920x1080 | 67.2 | 1920 | 528 | 2448 | 128 | 60.0 | 1080 | 37 | 1117 | 3 | 1120 | 173.0 |
| 1920x1200 | 74.6 | 1920 | 536 | 2456 | 136 | 60.0 | 1200 | 42 | 1242 | 3 | 1245 | 154.0 |

Fig.7A

| 1280x1024 | hStart [Pixel] | hEnd [Pixel] | vStart [Line] | vEnd [Line] |
|---|---|---|---|---|
| MEASUREMENT POSITION | 510 | 1490 | 161 | 945 |
| FMT VALUE | 360 | 1640 | 41 | 1065 |
| DIFFERENCE (ABSOLUTE VALUE) | 150 | 150 | 120 | 120 |

Fig.7B

| 1400x1050 | hStart [Pixel] | hEnd [Pixel] | vStart [Line] | vEnd [Line] |
|---|---|---|---|---|
| MEASUREMENT POSITION | 510 | 1490 | 161 | 945 |
| FMT VALUE | 248 | 1648 | 15 | 1065 |
| DIFFERENCE (ABSOLUTE VALUE) | 262 | 158 | 146 | 120 |

DISPLAY APPARATUS

BACKGROUND

Field of the Invention

The present invention relates to a display apparatus and a method to determine a format.

Description of the Related Art

Display apparatuses such as liquid crystal display apparatuses drive a display unit such as a liquid crystal panel with a signal obtained by converting an analog image signal, which is output from an image output apparatus such as a personal computer (PC), into a digital image signal through an A/D conversion. In performing the A/D conversion, it is important to perform the sampling of an image signal based on an appropriate sampling clock for digitization. However, if the sampling is performed based on a false sampling clock, there is a likelihood of image degradation such as image irregularities and image deviations occurring. As a method for performing the sampling with an appropriate sampling clock, signal parameter values such as the frequency and the polarity of a synchronization signal contained in the image signal may be used. Specifically, the signal parameter values such as the frequency of the synchronization signal detected from the input image signal are identified with signal parameter information items on various image signals stored in a format table retained by an apparatus to determine the format of the input image signal. Then, the sampling is performed based on a sampling clock defined in the determined format.

In recent years, many types of image signal formats have been available with the diversification of formats supported by display apparatuses. Therefore, since there are formats having signal parameter values similar to signal parameter values detected from an input image signal, it may be difficult to exactly determine a format. If a format is falsely determined, the image signal is sampled with a false sampling clock and thus an appropriate A/D conversion is not allowed.

Japanese Patent Application Laid-open No. 2008-107474 discloses a method for assigning similarity degrees, which become lower as the differences between respective signal parameter values detected from an input image signal and signal parameter values stored in a format table become larger, to the respective signal parameter values and determining a format based on the sum of the similarity degrees. In addition, Japanese Patent Application Laid-open No. 2008-224773 discloses a method for comparing a vertical frequency and a data enable (DE) period of an input image signal with signal parameter values stored in a format table and determining a format based on the comparison results.

As in the related arts described above, it is possible to compare the measurement values of signal parameter values such as a synchronization signal frequency, a blanking period, a DE period, and a total number of vertical lines of an input image signal with signal parameter values stored in a format table to determine a format.

Here, since there is no analog image signal showing a DE period, the level of an image signal is measured to estimate the DE period. However, if an image nearly in black or an image in which all the effective display areas except for some areas are in black is input, a DE period may not be exactly estimated. Therefore, according to a configuration in which the detection result of the DE period of an input image signal is compared with values stored in a format table to determine a format, there is a likelihood that a format is falsely determined.

For example, in the case of a multi monitor configuration in which the image output of a notebook PC is input to an outside display apparatus so as to be displayed on multiple monitors, the outside display apparatus may have a larger pixel number than the display unit of the notebook PC. In such a case, an image, which is obtained by adding a black frame area to the periphery of an image (desktop image) output to the display unit of the notebook PC, is likely to be output to the outside display apparatus. Here, it is assumed that the image output to the display unit of the notebook PC represents an image not at a zero level (black) (for example, a white image). In this case, the periphery of the image not in black is surrounded by a black area in the image input to the outside display apparatus. Therefore, a period corresponding to the surrounding black image becomes zero (pedestal level) as a signal level. Accordingly, if the signal is measured, only the desktop image region is measured as a DE period while the surrounding black image region is not measured as a DE period although originally showing the DE period. If the measurement result is identified with a format table to determine a format, there is a likelihood that a format is falsely determined. Therefore, if the sampling of an image signal, the adjustment of a display field angle, or the like is performed based on signal parameter values defined in the determined format, image irregularities such as the smearing and the blurring of an image and the deviation of the display field angle are likely to occur.

SUMMARY

According to an aspect of the present invention, there are provided an apparatus and method to determine a format of an image signal.

According to another aspect of the present invention, there is provided a display apparatus comprising: a detecting unit that detects a start position and an end position of an effective image area of an analog image signal; and a determination unit that determines a candidate format as a format of the analog image signal if a first difference and a second difference satisfy a predetermined condition, wherein the first difference represents a difference between the start position of the effective image area and a start position of an effective image area of the candidate format, and the second difference represents a difference between the end position of the effective image area and an end position of the effective image area of the candidate format.

According to another aspect of the present invention, there is provided a method comprising: detecting a start position and an end position of an effective image area of an analog image signal; and determining a candidate format as a format of the analog image signal if a first difference and a second difference satisfy a predetermined condition, wherein the first difference represents a difference between the start position of the effective image area and a start position of an effective image area of the candidate format, and the second difference represents a difference between the end position of the effective image area and an end position of the effective image area of the candidate format.

Further features and aspects of the present invention will become apparent from the following description of exemplary embodiments.

BRIEF DESCRIPTION OF THE DRAWINGS

FIGS. 7A and 7B are diagrams showing the differences between the measurement values of candidate formats and the values in the format table.

DESCRIPTION OF THE EMBODIMENTS

The drawings, which are incorporated in and constitute a part of the specification, illustrate exemplary embodiments, features, and aspects of the present invention.

Note that each functional block, which will be described in the following exemplary embodiments, is not necessarily required to be a separate hardware device. That is, the functions of, for example, some functional blocks may be performed by one hardware device. In addition, the function of one functional block or the functions of functional blocks may be performed by the cooperative operation between some hardware devices. Moreover, the function of each functional block may be performed by a computer program developed into a memory by a central processing unit (CPU).

First Exemplary Embodiment

A first exemplary embodiment will describe a case in which a projector including a liquid crystal panel acts as a display apparatus.

Figure 1:
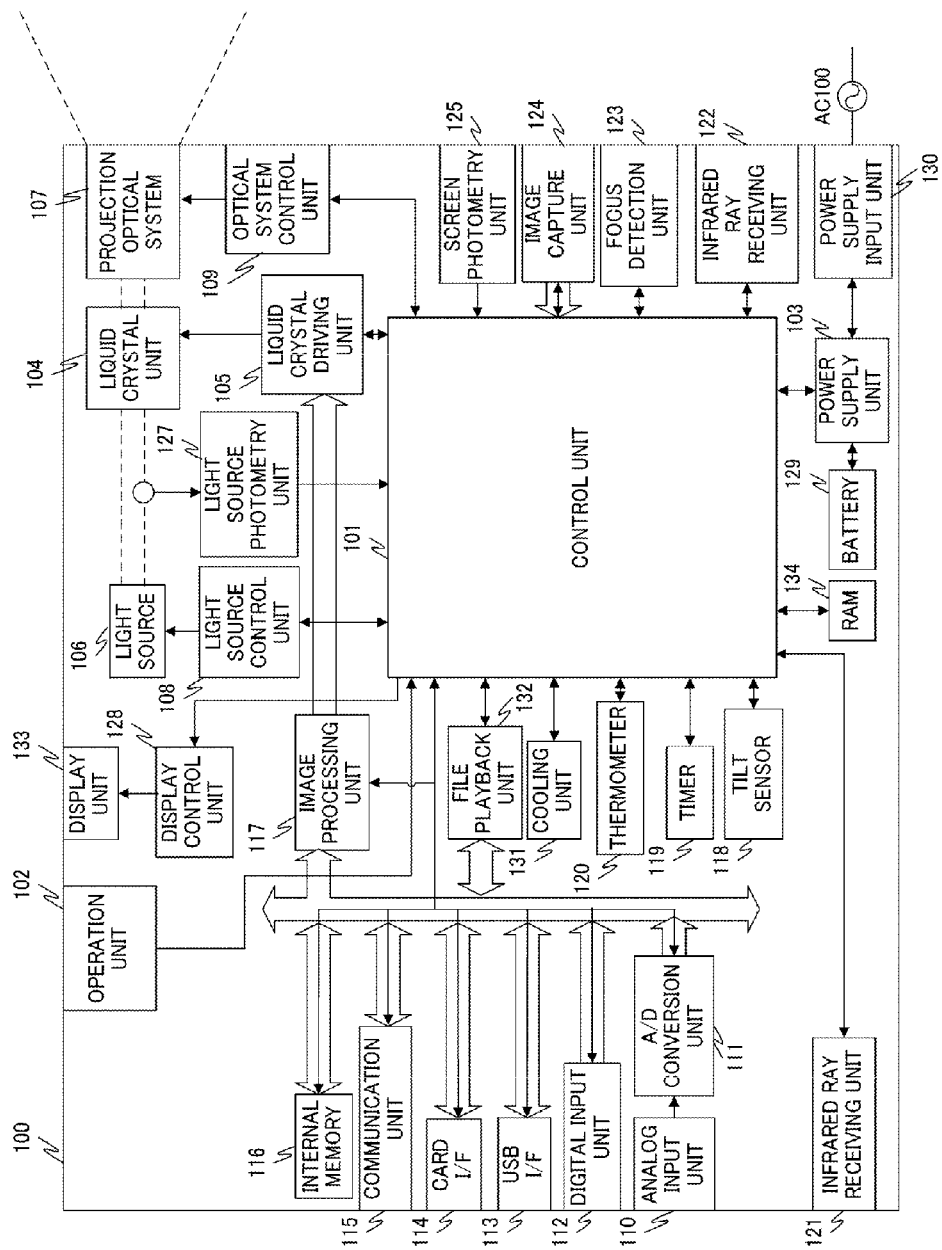
FIG. 1 is a diagram for describing the main constituents of a display apparatus in a first exemplary embodiment.

FIG. 1 is a diagram for describing the main constituents of a projector 100 serving as an example of the display apparatus in the first exemplary embodiment.

A control unit 101 controls each block in the projector 100. The control unit 101 is connected to each block in the projector 100 through a bus as shown in FIG. 1, and accesses each block in the projector 100 via a bus to perform the issuance of instructions for control, the sending/receiving of data, or the like.

An operation unit 102 accepts an operation from a user.

A power supply unit 103 controls the supply of power to each block in the projector 100.

A liquid crystal unit 104 includes one liquid crystal panel or three liquid crystal panels, and an image is formed on the one liquid crystal panel or the three liquid crystal panels.

A liquid crystal driving unit 105 forms an image on the one liquid crystal panel or the three liquid crystal panels in the liquid crystal unit 104 based on an image signal input from an image processing unit 117 that will be described later.

A light source 106 applies light onto the liquid crystal unit 104.

A projection optical system 107 projects an optical image, which is obtained when the light emitted from the light source 106 is applied and transmitted onto the liquid crystal unit 104, onto a screen.

A light source control unit 108 controls the light amount or the like of the light source 106.

An optical system control unit 109 controls operations of zoom lens, focus lens, or the like of the projection optical system 107 and performs the adjustments of a zooming magnification and a focus or the like.

An analog input unit 110 accepts an analog image signal output from a PC, a DVD player, a TV tuner, or the like. The analog input unit 110 includes, for example, an RGB terminal, an S terminal, or the like.

An A/D conversion unit 111 converts the analog image signal input from the analog input unit 110 into a digital image signal. Examples of an A/D conversion system include, besides a double-integral type by which an analog input voltage is integrated for a certain period of time, a parallel-comparison type that uses a comparator and a successive-comparison type that performs comparison with a D/A conversion value. However, the first exemplary embodiment is not limited to the systems described above. In addition, the A/D conversion unit 111 measures the signal parameter values of the input analog image signal. The A/D conversion unit 111 measures, for example, the frequency, the number of scanning lines, the signal, or the like of a synchronization signal as the signal parameter values. The A/D conversion unit 111 makes various settings on the A/D conversion and performs the A/D conversion based on the settings.

A digital input unit 112 accepts a digital image signal from a personal computer (PC), a DVD player, or the like. The digital input unit 112 includes, for example, a High-Definition Multimedia Interface (HDMI) terminal or the like. If the digital input unit 112 includes a HDMI terminal, a control signal may also be simultaneously sent from an outside to the digital input unit 112 to perform the control of an image or the like. The image signal input from the digital input unit 112 is directly sent to the image processing unit 117.

A USB interface 113 is an interface that receives a file storing image data and various information data from outside equipment or writes the same into the outside equipment. The USB interface 113 is connected to a pointing device, a keyboard, a flash memory, or the like.

A card interface 114 is an interface that reads/writes a file storing image data and various information data from/into a card type recording medium and allows an SD card, a compact flash, or the like to be inserted therein. A document file input via the card interface 114 is played back by a file playback unit 132. The file playback unit 132 generates an image signal to be presented to a user from the document file and outputs the same to the image processing unit 117.

A communication unit 115 is an interface that sends/receives a file storing image data and various information data, a control signal, or the like via an intranet and the Internet and includes, for example, a wired LAN, a wireless LAN, or the like.

An internal memory 116 is a storage unit that retains a file storing image data and various information data and includes a semiconductor memory, a hard disk, or the like.

With respect to the image signals input from the various interfaces described above and the file playback unit 132 and the image signal input from the control unit 101, the image processing unit 117 performs an analysis or performs a correction suitable for a display on the liquid crystal unit 104. For example, with respect to the image signals, the image processing unit 117 converts the number of pixels according to the number of the pixels of a liquid crystal panel or converts the number of frames (a frame rate). The liquid crystal panel performs alternating current drive to alternately switch the direction of a voltage applied to a liquid crystal to perform an image display. The drive method makes use of the characteristics in which the liquid crystal panel is allowed to form an image regardless of whether the direction of the voltage applied to the liquid crystal is a forward direction or a reverse direction. According to the drive method, an image in the forward direction and an image in the reverse direction are required to be input to the liquid crystal driving unit 105. Therefore, the image signal is subjected to processing in which the number of frames is doubled.

The image processing unit 117 may also perform various analyses with respect to the digital signal input from the A/D conversion unit 111. For example, there is a likelihood that the analog image signal input to the analog input unit 110 does not include a data enable (DE) signal showing a display start position. In such a case, the image processing unit 117 measures the display start position by performing an analysis based on horizontal and vertical synchronization signals and an image signal. Based on the analysis result, the control unit 101 performs control on image processing and the A/D conversion of the A/D conversion unit 111.

The image processing unit 117 performs a keystone correction. In the keystone correction, the image processing unit 117 deforms an image so as to correct a trapezoidal distortion occurring in the projected image, for example, when the projection optical system 107 does not face a screen. In addition, the image processing unit 117 horizontally and/or vertically increases or decreases the size of an image displayed on the liquid crystal panel. Thus, the trapezoidal distortion occurring in the projected image due to the positional relationship between the projection optical system 107 and the screen and the distortion occurring in the image formed on the liquid crystal panel by the shape deformation correction cancel each other, which makes it possible to bring the image projected onto the screen close to an image having a normal aspect ratio. The keystone correction may be automatically performed based on an inclination angle obtained by a tilt sensor 118 that will be described later or may be manually operated by the user via the operation unit 102 or the like.

The tilt sensor 118 detects the inclination of the projector 100.

A timer 119 detects the operation time of the projector 100, the operation time of each block in the projector 100, or the like.

A thermometer 120 measures the temperature of the light source 106 of the projector 100, the temperature of the liquid crystal unit 104 thereof, an outside air temperature, or the like.

Each of an infrared radiation receiving unit 121 and an infrared radiation reception unit 122 receives an infrared radiation signal from a remote controller or other equipment controlling the projector 100 and sends a signal corresponding to the received infrared radiation signal to the control unit 101. In the first exemplary embodiment, infrared radiation reception units are provided. For example, the infrared radiation reception unit 122 is provided on the front side of the projector 100 (in a direction in which the projection optical system 107 is provided), and the infrared radiation receiving unit 121 is provided on the rear side thereof.

A focus detection unit 123 detects the distance between the projector 100 and a screen to adjust a focus.

An image capture unit 124 captures an image of the screen.

A screen photometry unit 125 measures the light amount or the brightness (luminance) of light reflected by the screen.

A light source photometry unit 127 measures the light amount or the brightness of light emitted from the light source 106.

A display unit 133 is arranged on the main body of the projector 100 and displays the status, the alert, or the like of the projector 100.

A display control unit 128 controls the display unit 133.

A battery 129 supplies power to the projector 100, for example, when the main body of the projector 100 operates without outside power supply.

A power supply input unit 130 accepts alternating current power from the outside and supplies the same to the power supply unit 103 after rectifying the power to a predetermined voltage.

A cooling unit 131 is a unit that cools the projector 100 by the emission of heat inside the projector 100 to the outside or the like and includes, for example, a heat sink and a fan.

A RAM (random access memory) 134 is used as a unit that develops a program stored in the internal memory 116, a frame memory for a projected image, or the like.

Here, a description will be given of the normal operation of the projector 100.

Upon receiving an instruction for turning on power via the operation unit 102, the control unit 101 of the projector 100 of the first exemplary embodiment instructs the power supply unit 103 to supply the power to each block in the projector 100 and brings each block in the projector 100 into a standby state. After the input of the power supply, the control unit 101 instructs the light source control unit 108 to start the light emission of the light source 106. Next, the control unit 101 instructs the optical system control unit 109 to control the projection optical system 107 based on information relating to a distance of a focus point or the like obtained by the focus detection unit 123. The optical system control unit 109 operates the zoom lens or the focus lens of the projection optical system 107 to perform control such that a projected light image is formed on a screen. In the manner described above, preparations for the projection are completed.

Next, with respect to an image signal input to the digital input unit 112, the image processing unit 117 performs a conversion to a signal having a resolution suitable for the liquid crystal unit 104, a gamma correction, a correction for brightness unevenness, a keystone correction, or the like. The liquid crystal driving unit 105 drives the liquid crystal unit 104 based on the image signal corrected by the image processing unit 117, and an image is formed on the liquid crystal panel. When the light emitted from the light source 106 passes through the liquid crystal unit 104, the image formed on the liquid crystal panel of the liquid crystal unit 104 is projected onto the screen by the projection optical system 107, thus the image is displayed on the screen.

During the projection, the control unit 101 detects the temperature of the light source 106 or the like with the thermometer 120. For example, when the temperature of the light source 106 becomes 40 degrees or higher, the control unit 101 operates the cooling unit 131 to cool the projector 100.

Upon receiving an instruction for turning off the power via the operation unit 102, the control unit 101 instructs each block in the projector 100 to perform termination processing. When preparations for stopping the power supply are completed, the power supply unit 103 successively stops the power supply to each block in the projector 100. After the stop of the power supply to each block in the projector 100, the cooling unit 131 operates for a while to cool the projector 100.

Here, the description refers to a case in which an image is displayed based on an image signal input from the digital input unit 112. However, the same processing is also applied to a case in which an image signal or image data input from the various interfaces described above is displayed.

Next, a description will be given, with reference to FIGS. 2 to 5, of a format determining process for an analog image signal in the first exemplary embodiment.

Figure 2:
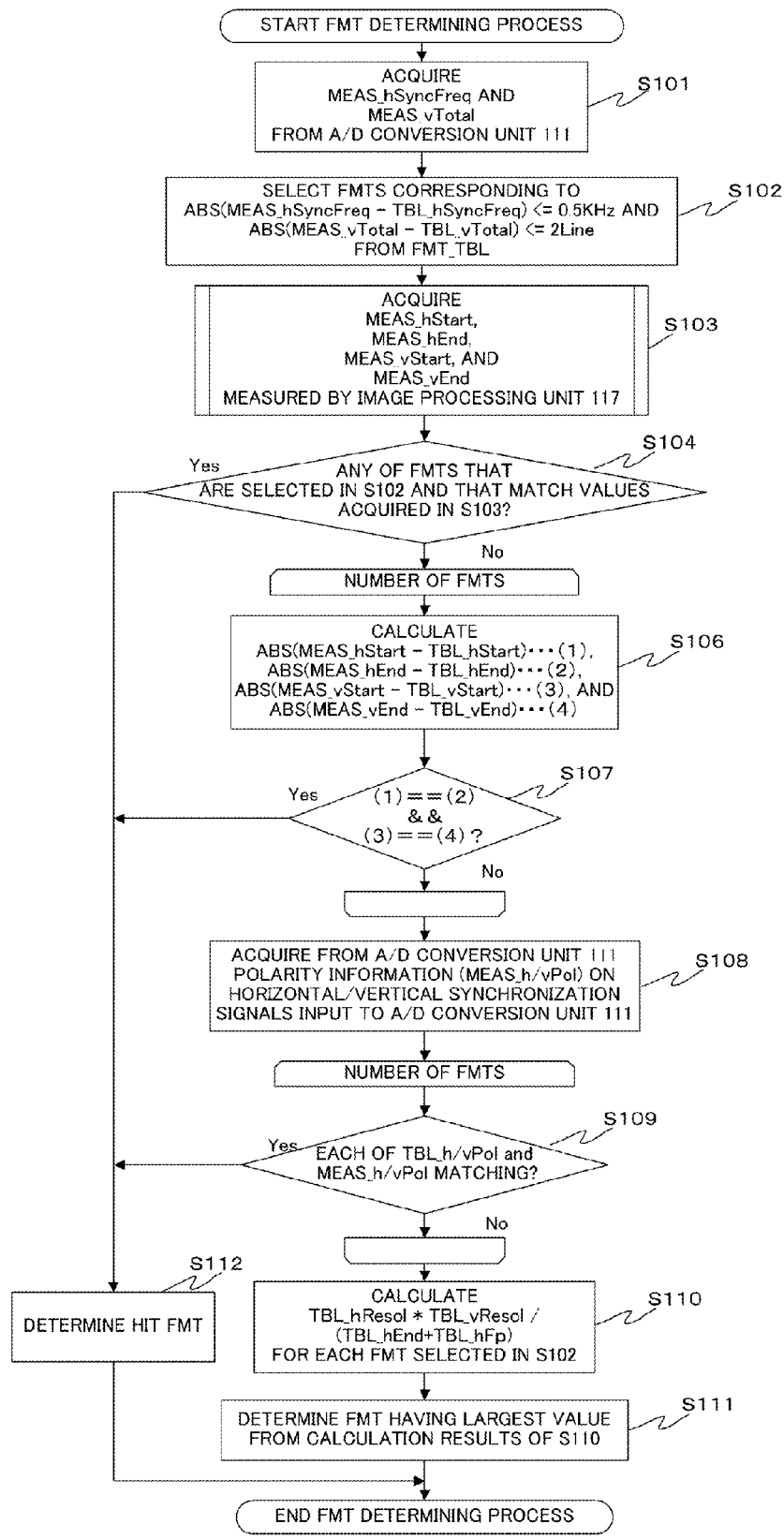
FIG. 2 is a flowchart for describing a format determining process in the first exemplary embodiment.

FIG. 2 is a flowchart for describing the format determining process in the first exemplary embodiment. The starting trigger of the format determining process is based on the detection of the input of an analog image signal to the analog input unit 110, changes in the signal parameter values of the analog image signal input to the analog input unit 110, or the like. The changes in the signal parameter values occur, for example, when output resolution settings are changed in an image signal output device that outputs the analog image signal. However, the starting trigger of the format determining process may be based on other conditions. The control unit 101 of the projector 100 performs the format determining process when detecting the input of the analog image signal via the analog input unit 110. The control unit 101 is notified of the input of the analog image signal through the interruption notification of the A/D conversion unit 111. Alternatively, the control unit 101 grasps the input of the analog image signal by polling the input of a synchronization signal to the A/D conversion unit 111. However, the control unit 101 may grasp the input of the analog image signal according to other methods.

Figure 3:
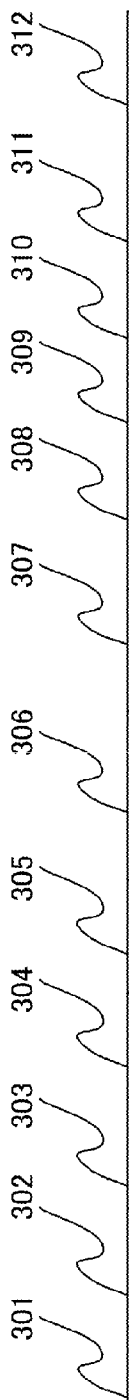
FIG. 3 is a diagram showing an example of a format table retained by the display apparatus in the first exemplary embodiment.

FIG. 3 is a format table showing an example of formats supported by the projector 100 in the first exemplary embodiment. The format table is retained by the internal memory 116 and developed into the RAM 134 according to an instruction from the control unit 101 when the projector 100 starts. For each format, the format table has information items, i.e., a format name (FMT_NAME), a horizontal synchronous frequency (hSyncFreq) 301, a horizontal period of effective image area (hResol) 302, a horizontal start position of effective image area (hStart) 303, a horizontal end position of effective image area (hEnd) 304, a horizontal front porch (hFp) 305, a vertical synchronization frequency (vSyncFreq) 306, a vertical period of effective image area (vResol) 307, a vertical start position of effective image area (vStart) 308, a vertical end position of effective image area (vEnd) 309, a vertical front porch (vFp) 310, a total number of vertical lines (vTotal) 311, and a sampling clock (SamplingClock) 312. As shown in FIG. 3, the projector 100 of the first exemplary embodiment supports, for example, the eight types of formats.

In FIG. 2, in step S101, when the format determining process starts with the detection of the input of an analog image signal, the control unit 101 acquires the signal parameter values of the input analog image signal from the A/D conversion unit 111 via a bus and loads the same into the RAM 134. It is assumed that the signal parameter values acquired by the control unit 101 include a horizontal synchronous frequency (MEAS_hSynchFreq) and a total number of vertical lines (MEAS_vTotal). However, the signal parameter values acquired by the control unit 101 may include other information items. Such information items are those regularly measured by the A/D conversion unit 111, and their measurement results are retained by the inside register of the A/D conversion unit 111 and updated at a predetermined interval.

In step S102, the control unit 101 compares a horizontal synchronous frequency and a total number of vertical lines of the format table with the horizontal synchronous frequency and the total number of vertical lines acquired from the A/D conversion unit 111. The horizontal synchronous frequency (TBL_hSyncFreq) and the total number of vertical lines (TBL_vTotal) of each format of the format table are loaded into the RAM 134 in advance. Based on the comparison calculation, the control unit 101 determines whether any of formats satisfying the matching conditions of the horizontal synchronous frequency and the total number of vertical lines exists in the format table. It is assumed that the matching condition of the horizontal synchronous frequency is satisfied when the absolute values of the differences between the measured horizontal synchronous frequency (MEAS_hSynchFreq) and the horizontal synchronous frequencies (TBL_hSyncFreq) 301 of the format table are 0.5 KHz or less. In addition, it is assumed that the matching condition of the total number of vertical lines is satisfied when the absolute values of the differences between the measured total number of vertical lines (MEAS_vTotal) and the total number of vertical lines (TBL_vTotal) 311 of the format table are two lines or less. Based on the measurement values of the acquired signal parameters, the control unit 101 performs an identification process as to whether any of formats satisfying the matching conditions of both the horizontal synchronous frequency and the total number of vertical lines exists in the format table. The control unit 101 selects, as a candidate format for the format of the input image signal, a format satisfying the matching conditions of both the horizontal synchronous frequency and the total number of vertical lines.

Here, as an example, it is assumed that the analog image signal of the parameter values shown in the format name "1280×1024" of the format table of FIG. 3 is input. In addition, it is assumed that the analog image signal input here represents the signal of an image shown in a test pattern 200 of FIG. 4, in which the periphery (having 150 pixels on the right and left sides thereof and 120 lines on the top and bottom sides thereof) of an image not in black, is surrounded by a black area (zero level).

Figure 6:
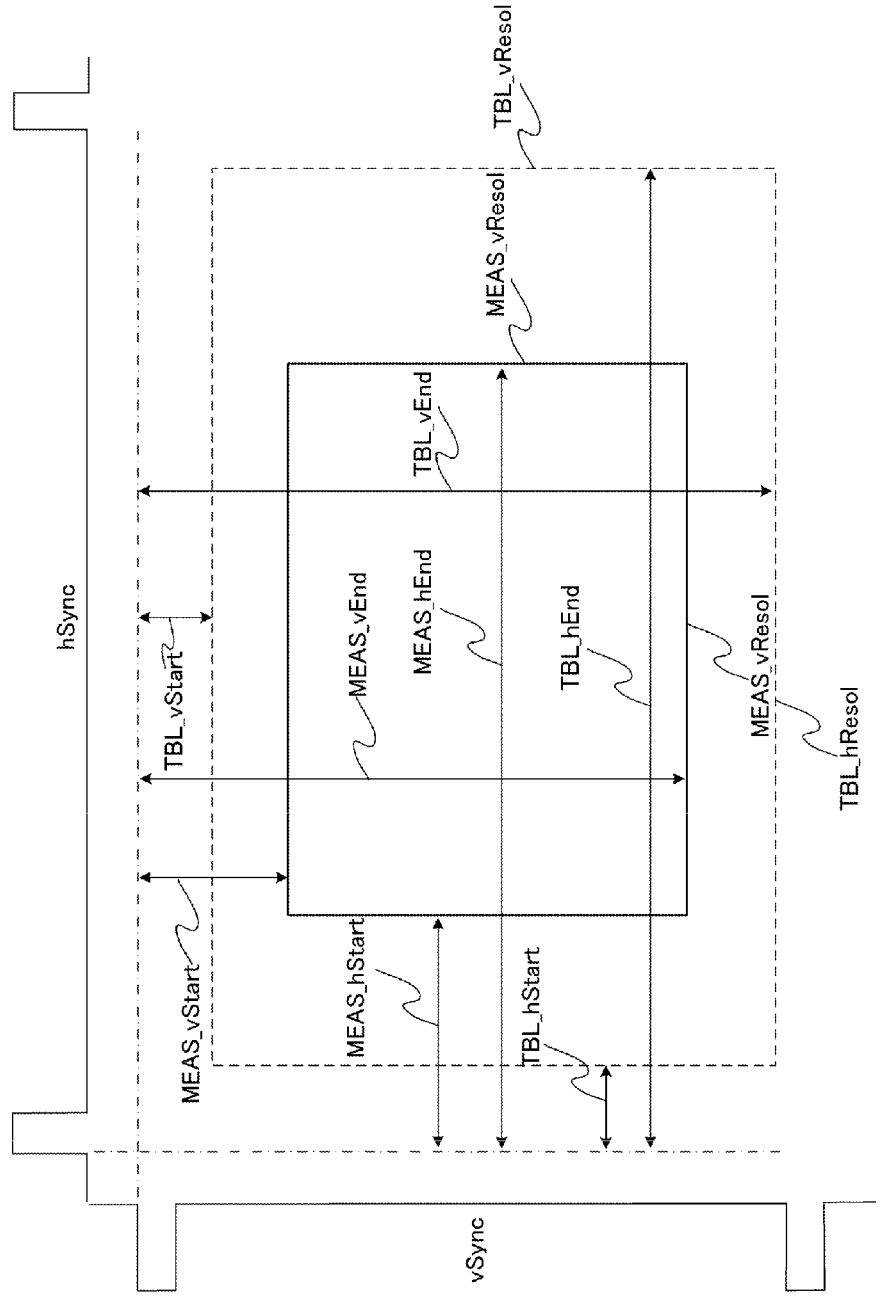
FIG. 6 is a diagram for describing the relationship between the measurement values of an effective image area and values in the format table.

FIG. 6 is a diagram for describing the positions of an effective image area obtained when an input image signal is measured and values defined in the format table. In FIG. 6, MEAS_hStart, MEAS_hEnd, MEAS_vStart, and MEAS_vEnd represent a horizontal start position of effective image area, a horizontal end position of effective image area, a vertical start position of effective image area, and a vertical end position of effective image area measured by the A/D conversion unit 111, respectively. In addition, TBL_hStart, TBL_hEnd, TBL_vStart, and TBL_vEnd represent a horizontal start position of effective image area, a horizontal end position of effective image area, a vertical start position of effective image area, and a vertical end position of effective image area defined in the format table, respectively.

When the analog image signal having the signal parameter values of the format "1280×1024" is input, the format "1280×1024" and the format "1400×1050" are selected from the format table as candidate formats according to the comparison calculation of step S102.

In step S103, the control unit 101 reads information items on the measurement values of the input analog image signal from the A/D conversion unit 111. Here, as described above, the measurement values include the horizontal start position of effective image area (MEAS_hStart), the horizontal end position of effective image area (MEAS_hEnd), the vertical start position of effective image area (MEAS_vStart), and the vertical end position of effective image area (MEAS_vEnd). A description will be given, with reference to FIG. 5, of a method for detecting the horizontal start position of effective image area (MEAS_hStart), the horizontal end position of effective image area (MEAS_hEnd), the vertical start position of effective image area (MEAS_vStart), and the vertical end position of effective image area (MEAS_vEnd) with the image processing unit 117.

Figure 5:
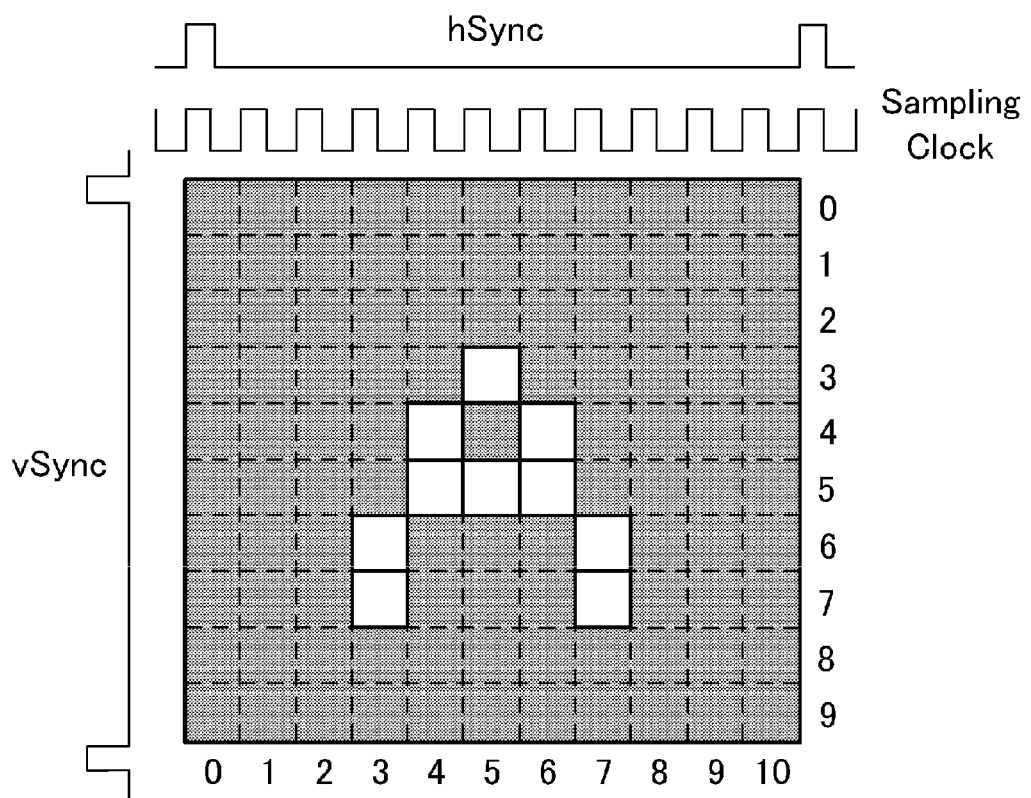
FIG. 5 is a diagram showing an example of an image for describing an effective area measuring process.

FIG. 5 is a diagram showing the image of 11 pixels×10 lines. Outline pixels having a blank inside them show effective pixels detectable as the image, and the other pixels show black pixels at a basic level (pedestal level) not detectable as the image. The effective pixels represent pixels other than black pixels in a digital image signal converted by the A/D conversion unit 111, i.e., pixels in which any of RGB values of the digital image signal is a value other than zero when the A/D conversion is performed in the range of zero to 255. Here, as shown in FIG. 5, the clock of the A/D conversion unit 111 is set such that the A/D conversion is performed at a clock at which one line (11 pixels) is sampled 11 times.

The image processing unit 117 starts counting the input times of a sampling clock (SamplingClock) and a horizontal synchronization signal (hSync) when detecting the inputs of a vertical synchronization signal (vSync) and the horizontal synchronization signal (hSync).

Next, at a timing at which the sampling clock is input, the image processing unit 117 starts measuring the digital image signal converted by the A/D conversion unit 111. When detecting the effective pixels, the image processing unit 117 regards the count value of the sampling clock at that time as the start position of the image signal in a horizontal direction. In addition, the image processing unit 117 regards the count value of the horizontal synchronization signal as the start position of the image signal in a vertical direction. The image processing unit 117 retains information items on the start positions of the input image signal in the horizontal and vertical directions in the register thereof. The information items are retained in the resister when the effective pixels of the image signal are first detected in the respective horizontal and vertical directions.

Subsequently, the sampling clock that has been counted when the image processing unit 117 detects the input of the horizontal synchronization signal is cleared, and the start and end positions of effective image area are repeatedly measured in the horizontal direction until the input of the next vertical synchronization signal is detected.

When detecting the input of the next vertical synchronization signal, the image processing unit 117 retains the maximum values of the sampling clocks and the horizontal synchronization signals, which have been counted by that time, in the register thereof as the end positions of effective image area in the horizontal and vertical directions, respectively.

The image processing unit 117 performs the operations described above for each input of the vertical synchronization signal to detect the start and end positions of effective image area of the image signal for each frame.

When it is assumed that the image of FIG. 5 is input to the image processing unit 117 via the A/D conversion unit 111, the minimum sampling clock input times "three" and the maximum sampling clock input times "seven" are retained in the register of the image processing unit 117 in the sixth or seventh line in the horizontal direction. In the vertical direction, the first effective area of the image signal is detected in the third line, and the last effective area thereof is detected in the seventh line. Therefore, the vertical start position "three" and the vertical end position "seven" are retained in the register of the image processing unit 117.

Moreover, the start and end positions of effective image area in the horizontal direction may be converted based on a sampling clock frequency input from the A/D conversion unit 111.

It is assumed that the sampling clock set to the A/D conversion unit 111 by the control unit 101 is at 100 MHz. Since the horizontal start position of effective image area is in the third pixel, it may be calculated that the horizontal start position of effective image area comes 30 ns after the input of the horizontal synchronization signal when the sampling clock has a clock frequency of 100 MHz. In addition, it may also be calculated that the horizontal end position of effective image area comes 70 ns after the input of the horizontal synchronization signal. In the manner described above, the start and end positions may be detected as line numbers in the vertical direction and detected as times in the horizontal direction.

Thus, the image processing unit 117 measures the horizontal start position of effective image area (MEAS_hStart), the horizontal end position of effective image area (MEAS_hEnd), the vertical start position of effective image area (MEAS_vStart), and the vertical end position of effective image area (MEAS_vEnd). The image processing unit 117 retains the measurement values in the register thereof.

Figure 4:
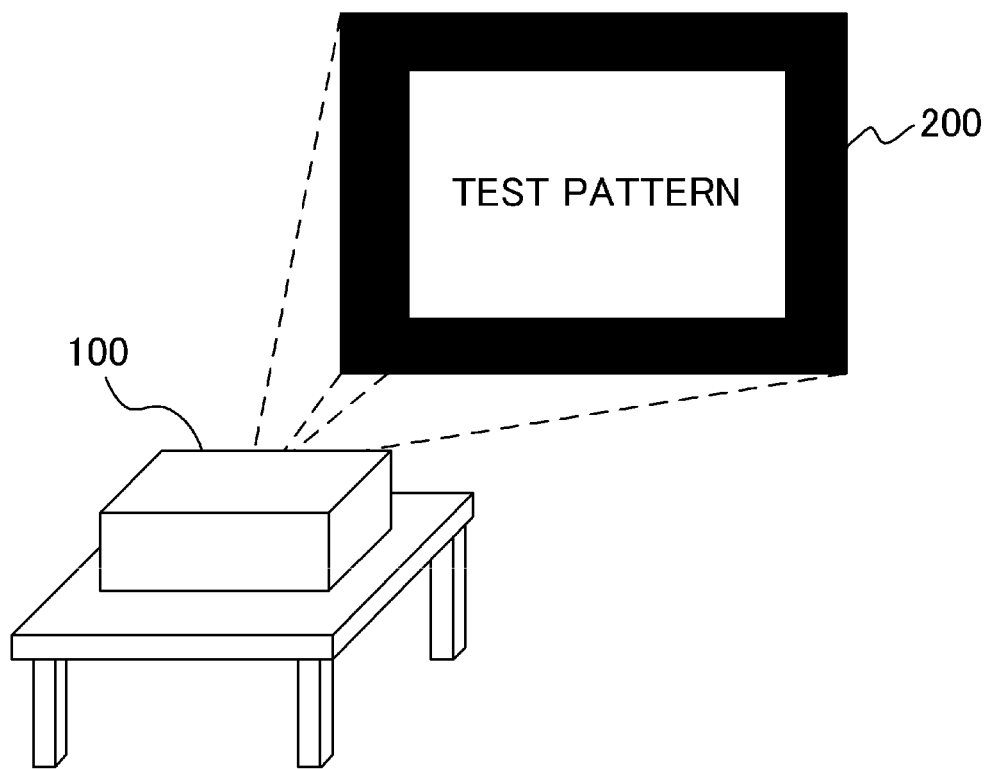
FIG. 4 is a diagram showing an example of a state in which an input image is projected onto a screen in the first exemplary embodiment.

In step S103, the control unit 101 sets the sampling clocks of the candidate formats selected in step S102 to the A/D conversion unit 111 and reads information items on the above various measurement values retained by the image processing unit 117. Since both the two selected formats have a sampling clock of 108.0 MHz, the control unit 101 sets the sampling clock to the A/D conversion unit 111 to perform sampling with the frequency. Here, the image 200 (1280×1024) shown in FIG. 4 is input, and the number of the pixels of the region not in black of the image 200 is smaller than the number of the pixels of the entire image 200 by the 150 pixels on the right and left sides and the 120 lines on the top and bottom sides as described above. Therefore, 510 pixels for the horizontal start position of effective image area, 1490 pixels for the horizontal end position of effective image area, 161 lines for the vertical start position of effective image area, and 945 lines for the vertical end position of effective image area are measured.

In step S104, the control unit 101 compares the start and end positions of the effective image area of the candidate format selected in step S102 with the measurement values of the start and end positions of the effective image area acquired in step S103 and determines whether any of formats matches. If any of formats matches, the control unit 101 transits to step S112, determines the matching candidate format as the format of the input image signal, and completes the format determining process.

On the other hand, if it is determined in step S104 that none of the candidate formats matches the measurement results, the control unit 101 transits to step S106. The control unit 101 calculates absolute values of differences between the start and end positions of the effective image area of the candidate format selected in step S102 and the measurement values of the start and end positions of the effective image area acquired in step S103.

FIGS. 7A and 7B are diagrams showing absolute values of differences between the start and end positions of the effective image areas of candidate formats ("1280×1024" and "1400×1050") selected in step S102 and the measurement values of the start and end positions of the effective image area acquired in step S103. In step S106, the control unit 101 calculates the following absolute values of differences.

An absolute value of a difference (1)=ABS (MEAS_hStart−TBL_hStart) between the measurement value of the horizontal start position of effective image area and the value of the horizontal start position of effective image area in the format table An absolute value of a difference (2)=ABS (MEAS_hEnd−TBL_hEnd) between the measurement value of the horizontal end position of effective image area and the value of the horizontal end position of effective image area in the format table An absolute value of a difference (3)=ABS(MEAS_vStart−TBL_vStart) between the measurement value of the vertical start position of effective image area and the value of the vertical start position of effective image area in the format table An absolute value of a difference (4)=ABS (MEAS_vEnd−TBL_vEnd) between measurement value of the vertical start position of effective image area and the value of the vertical end position of effective image area in the format table In step S107, determination is made as to whether the difference (1) in the horizontal start position of effective image area and the difference (2) in the horizontal end position of effective image area satisfy predetermined conditions and is made as to whether the difference (3) in the vertical start position of effective image area and the difference (4) in the vertical end position of effective image area satisfy predetermined conditions. Here, it is assumed that the predetermined conditions of the difference (1) (first difference) in the horizontal start position of effective image area and the difference (2) (second difference) in the horizontal end position of effective image area are such that the difference (1) in the horizontal start position of effective image area and the difference (2) in the horizontal end position of effective image area are equal to each other. In addition, it is assumed that the predetermined conditions of the difference (3) (third difference) in the vertical start position of effective image area and the difference (4) (fourth difference) in the vertical end position of effective image area are such that the difference (3) in the vertical start position of effective image area and the difference (4) in the vertical end position of effective image area are equal to each other. If the comparison results show that any of candidate formats satisfies both conditions "the difference (1)=the difference (2)" and "the difference (3)=the difference (4)", the control unit 101 proceeds to step S112 and determines the candidate format as the format of the input image signal. In case that the above conditions are satisfied, it is presumable that the input image signal represents the signal of an image as shown in, for example, FIG. 4 in which an image smaller in size than an effective image area is positioned at the center of the effective image area like when the desk-top screen of a PC is output to an outside monitor having a different pixel number. The control unit 101 instructs the A/D conversion unit 111 to perform the sampling of the image signal based on the sampling clock of the determined format. Note that the matching conditions of the first and second differences are not limited to the example described above but may be satisfied, for example, when a difference between the first and second differences fall within a threshold value. The same applies to the matching conditions of the third and fourth differences. In addition, the first exemplary embodiment refers to the example of determining any of candidate formats, in which the first and second differences satisfy the matching conditions described above and the third and fourth differences satisfy the matching conditions described above, as the format of the input image signal. However, other conditions may be satisfied. For example, any of candidate formats, in which only the first and second differences satisfy the matching conditions described above, may be determined as the format of the input image signal, or any of candidate formats, in which only the third and fourth differences satisfy the matching conditions, may be determined as the format of the input image signal. In addition, if the candidate formats satisfies the conditions, any of candidate formats format having the smallest difference between the first and second differences may be, for example, determined as the format of the input image signal. Moreover, any one of the candidate formats satisfying the conditions may be determined as the format of the input image signal.

On the other hand, in step S107, if the comparison results show that none of the candidate formats satisfies both conditions "the difference (1)=the difference (2)" and "the difference (3)=the difference (4)," the control unit 101 proceeds to step S108. In step S108, the control unit 101 acquires polarity information items on the horizontal and vertical synchronization signals input to the A/D conversion unit 111. Then, in step S109, the control unit 101 compares the polarity information items with polarity information items on the horizontal and vertical synchronization signals of the two types of candidate formats selected in step S102.

If the comparison results show that any of formats has the polarity information items matching the polarity information items of the horizontal and vertical synchronization signals input to the A/D conversion unit 111, the control unit 101 determines in step S112 the format as the format of the input image signal and instructs the A/D conversion unit 111 to perform the sampling of the image signal based on the sampling clock of the format.

On the other hand, if the comparison results show that none of the formats has the polarity information items matching the polarity information items of the horizontal and vertical synchronization signals input to the A/D conversion unit 111, the control unit 101 transits to step S110 to find any of formats having the largest ratio of an effective area to a region including a blanking region. Specifically, the control unit 101 calculates a horizontal resolution (TBL_hResol)×a vertical resolution (TBL_vResol)/a total number of horizontal dots (TBL_hEnd+TBL_Fp) for each of the candidate formats selected in step S102. The control unit 101 compares the calculation results with each other, determines the format having the largest value as the format of the input image signal, and instructs the A/D conversion unit 111 to perform the sampling of the image signal based on the sampling clock of the format.

Note that in the first exemplary embodiment, the format determining process is performed at the timing at which the input of the image signal is detected. However, the format determining process may be performed at other timings. For example, it may be possible that the control unit 101 reads an effective image area regularly measured by the image processing unit 117 and that the format determining process is performed with a change in the value as a trigger.

The first exemplary embodiment is described above. However, the present invention is not limited to the first exemplary embodiment but may be modified and changed in various ways within the spirit of the present invention. For example, the first exemplary embodiment is applicable to, besides projectors, various display apparatuses such as liquid crystal display apparatuses, cathode ray tubes (CRTs), and micro electro mechanical systems (MEMS) displays. In addition, the first exemplary embodiment is applicable to, besides display apparatuses, a clamp process for an input analog signal and entire image processing apparatuses that perform the clamp process.

Second Exemplary Embodiment

At least one of the various functions, processes, and methods described in the first exemplary embodiment can be achieved using a program. Hereinafter, in a second exemplary embodiment, a program for realizing at least one of the various functions, processes, and methods described in the first exemplary embodiment will be referred to as a "program X". Further, in the second exemplary embodiment, a computer for executing the program X will be referred to as a "computer Y". Examples of the computer Y include a personal computer, a microcomputer, and a central processing unit (CPU).

At least one of the various functions, processes, and methods described in the first exemplary embodiment can be realized by the computer Y executing the program X. In this case, the program X is supplied to the computer Y via a computer readable storage medium. A computer readable storage medium according to the second exemplary embodiment includes at least one of a hard disk device, a magnetic storage device, an optical storage device, a magneto-optical storage device, a memory card, a read only memory (ROM), and a random access memory (RAM). Further, the computer readable storage medium according to the second exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-011098, filed Jan. 24, 2014, which is hereby incorporated by reference herein in its entirety.

What is claimed is:

1. A display apparatus comprising:
a memory; and
a processor that executes instructions stored in the memory, wherein the processor
(a) detects a horizontal start position, a horizontal end position, a vertical start position, and a vertical end position of an effective image area of an input analog image signal,
(b) calculates a first difference that represents a difference between the detected horizontal start position of the input analog image signal and a horizontal start position of an effective image area of a candidate format,
(c) calculates a second difference that represents a difference between the detected horizontal end position of the input analog image signal and a horizontal end position of the effective image area of the candidate format,
(d) calculates a third difference that represents a difference between the detected vertical start position of the input analog image signal and a vertical start position of the effective image area of the candidate format,
(e) calculates a fourth difference that represents a difference between the detected vertical end position of the input analog image signal and a vertical end position of the effective image area of the candidate format,
(f) determines whether the calculated first difference and the calculated second difference satisfy a first predetermined condition,
(g) determines whether the calculated third difference and the calculated fourth difference satisfy a second predetermined condition,
(h) determines the candidate format as a format of the input analog image signal if the calculated first difference and the calculated second difference satisfy the first predetermined condition and the calculated third difference and the calculated fourth difference satisfy the second predetermined condition,
(i) calculates a fourth value for each of candidate formats, by dividing a product of a first value and a second value by a third value, if the first predetermined condition or the second predetermined condition is not satisfied, wherein the first value represents a horizontal resolution of a candidate format, the second value represents a vertical resolution of a candidate format, and the third value represents a total number of horizontal dots of a candidate format, and
(j) determines one of the candidate formats as a format of the input analog image signal, based on the fourth values calculated for the candidate formats, if the first predetermined condition or the second predetermined condition is not satisfied.

2. The display apparatus according to claim 1, wherein
the first predetermined condition is satisfied if the calculated first difference and the calculated second difference are equal to each other or if a difference between the calculated first difference and the calculated second difference falls within a threshold value, and
the second predetermined condition is satisfied if the calculated third difference and the calculated fourth difference are equal to each other or if a difference between the calculated third difference and the calculated fourth difference falls within a threshold value.

3. A method comprising:
detecting a horizontal start position, a horizontal end position, a vertical start position, and a vertical end position of an effective image area of an input analog image signal;
calculating a first difference that represents a difference between the detected horizontal start position of the input analog image signal and a horizontal start position of an effective image area of a candidate format;
calculating a second difference that represents a difference between the detected horizontal end position of the input analog image signal and a horizontal end position of the effective age area of the candidate format,
calculating a third difference that represents a difference between the detected vertical start position of the input analog image signal and a vertical start position of the effective image area of the candidate format;
calculating a fourth difference that represents a difference between the detected vertical end position of the input analog image signal and a vertical end position of the effective image area of the candidate format;
determining whether the calculated first difference and the calculated second difference satisfy a first predetermined condition;
determining whether the calculated third difference and the calculated fourth difference satisfy a second predetermined condition;
determining the candidate format as a format of the input analog image signal if the calculated first difference and the calculated second difference satisfy the first predetermined condition and the calculated third difference and the calculated fourth difference satisfy the second predetermined condition;
calculating a fourth value for each of candidate formats, by dividing a product of a first value and a second value by a third value, if the first predetermined condition or the second predetermined condition is not satisfied, wherein the first value represents a horizontal resolution of a candidate format, the second value represents a vertical resolution of a candidate format, and the third value represents a total number of horizontal dots of a candidate format; and determining one of the candidate formats as a format of the input analog image signal, based on the fourth values calculated for the candidate formats, if the first predetermined condition or the second predetermined condition is not satisfied.

4. The method according to claim 3, wherein
the first predetermined condition is satisfied if the calculated first difference and the calculated second difference are equal to each other or if a difference between the calculated first difference and the calculated second difference falls within a threshold value, and
the second predetermined condition is satisfied if the calculated third difference and the calculated fourth difference are equal to each other or if a difference between the calculated third difference and the calculated fourth difference falls within a threshold value.

5. A non-transitory storage medium that stores a program causing a computer to execute a method, the method comprising:

detecting a horizontal start position, a horizontal end position, a vertical start position, and a vertical end position of an effective image area of an input analog image signal;

calculating a first difference that represents a difference between the detected horizontal start position of the input analog image signal and a horizontal start position of an effective image area of a candidate format;

calculating a second difference that represents a difference between the detected horizontal end position of the input analog image signal and a horizontal end position of the effective image area of the candidate format;

calculating a third difference that represents a difference between the detected vertical start position of the input analog image signal and a vertical start position of the effective image area of the candidate format;

calculating a fourth difference that represents a difference between the detected vertical end position of the input analog image signal and a vertical end position of the effective image area of the candidate format;

determining whether the calculated first difference and the calculated second difference satisfy a first predetermined condition;

determining whether the calculated third difference and the calculated fourth difference satisfy a second predetermined condition;

determining the candidate format as a format of the input analog image signal if the calculated first difference and the calculated second difference satisfy the first predetermined condition and the calculated third difference and the calculated fourth difference satisfy the second predetermined condition;

calculating a fourth value for each of candidate formats, by dividing a product of a first value and a second value by a third value, if the first predetermined condition or the second predetermined condition is not satisfied, wherein the first value represents a horizontal resolution of a candidate format, the second value represents a vertical resolution of a candidate format, and the third value represents a total number of horizontal dots of a candidate format; and determining one of the candidate formats as a format of the input analog image signal, based on the fourth values calculated for the candidate formats, if the first predetermined condition or the second predetermined condition is not satisfied.

6. The display apparatus according to claim 1, further comprising a conversion unit that converts the input analog video signal to a digital signal using a sampling clock frequency specified by the candidate format, when the candidate format is determined as the format of the input analog image signal.

7. The display apparatus according to claim 1, wherein the display apparatus includes a projector.

8. The display apparatus according to claim 1, wherein the display apparatus includes a liquid crystal display.

9. The method according to claim 3, further comprising converting the input analog video signal to a digital signal using a sampling clock frequency specified by the candidate format, when the candidate format is determined as the format of the input analog image signal.

10. The method according to claim 3, wherein the method is implemented in a display apparatus including a projector.

11. The method according to claim 3, wherein the method is implemented in a display apparatus including a liquid crystal display.

* * * * *